(No Model.)

A. A. SMYTH, Sr.
MACHINE FOR WELDING PIPE, &c.

No. 267,029. Patented Nov. 7, 1882.

WITNESSES:
Fred. G. Dieterich
Newton L. Collamer

INVENTOR.
Alexander A. Smyth, Sr.,
by C. A. Snow & Co.,
ATTORNEYS.

UNITED STATES PATENT OFFICE.

ALEXANDER A. SMYTH, SR., OF TITUSVILLE, PENNSYLVANIA.

MACHINE FOR WELDING PIPE, &c.

SPECIFICATION forming part of Letters Patent No. 267,029, dated November 7, 1882.

Application filed June 16, 1882. (No model.)

To all whom it may concern:

Be it known that I, ALEXANDER A. SMYTH, Sr., of Titusville, in the county of Crawford and State of Pennsylvania, have invented certain new and useful Improvements in a Machine for Welding and Piecing Out Boiler-Flues; and I do hereby declare that the following is a full, clear, and exact description of the invention, which will enable others skilled in the art to which it appertains to make and use the same, reference being had to the accompanying drawings, which form a part of this specification.

This invention relates to machines for welding and piecing out pipe, boiler-flues, and the like; and it consists in certain improvements in the construction and operation of the same.

Figure 1:
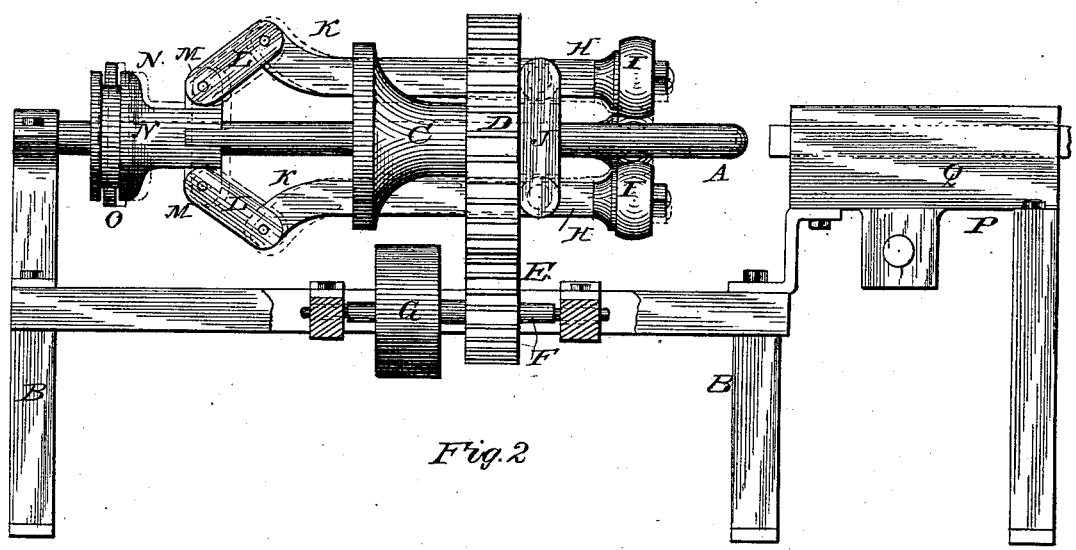
Figure 2:
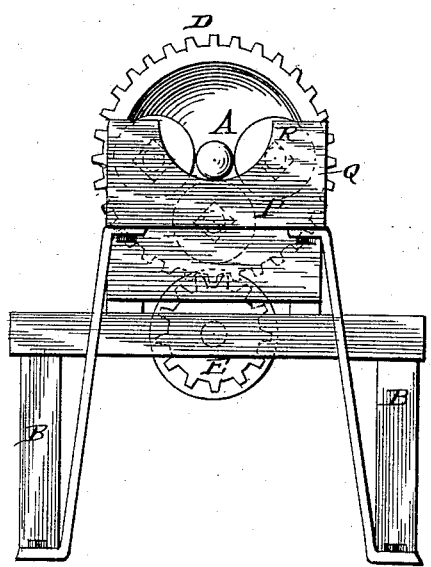

In the drawings, Figure 1 is a top view of the welding-machine and forge, and Fig. 2 an end view of the former.

Referring by letter to the drawings, A designates a stationary mandrel, mounted on suitable frame-work, B, and carrying a hub, C, on which is fixed a gear-wheel, D, meshing with a pinion, E, on a shaft, F, carrying a band-wheel, G, by which motion is communicated to rotate hub C.

H designates three rods or arms, each carrying a roller, I, at its forward end, two of which are to weld and the remaining one to finish. The arms are pivoted to the forward end of hub C, as at J, and have their rear ends K, turned outwardly and connected each by a link, L, pivoted at both ends M to a clutch or sliding collar, N, on mandrel A, said collar being operated by a lever, O. Thus by sliding the collar forward the arms H act as levers, their pivots forming the fulcrum, and press the rollers to the work, as shown in dotted lines, Fig. 1. The arms H are preferably arranged, as herein shown, with the three rollers around three-quarters of the circumference of the mandrel.

P designates a forge, which may be of any suitable construction, and is provided with an end supporting-plate, Q, having a curved groove or channel, R, through which the pipe is fed and heated before being placed on the mandrel.

The welding-machine and forge may be both portable, if desired.

The operation and advantages of my invention will be readily understood. The tubing is placed on the mandrel and the welding effected by the rollers, which turn on the arms while the latter are rotated round the mandrel.

I claim and desire to secure by Letters Patent—

1. The combination, with the stationary mandrel, of the three rollers arranged around the same to cover three adjacent quadrants only of the surface of the mandrel, and adapted to travel around the latter, substantially as specified.

2. The combination, with the stationary mandrel and the rotary hub on the same, of the pivoted arms carrying the rollers, the connecting links or pieces, and the sliding clutch or collar, substantially as set forth.

3. Jointly with the welding-machine having the stationary mandrel to receive the tubing, a forge having a supporting-plate provided with a curved groove or channel through which the tubing is fed, as set forth.

In testimony that I claim the foregoing as my own I have hereunto affixed my signature in presence of two witnesses.

ALEXANDER A. SMYTH, SR.

Witnesses:
T. S. McFARLAND,
JOSEPH T. CHASE.